No. 781,571. PATENTED JAN. 31, 1905.
G. P. THOMAS.
TEMPORARY FASTENING.
APPLICATION FILED APR. 12, 1904.
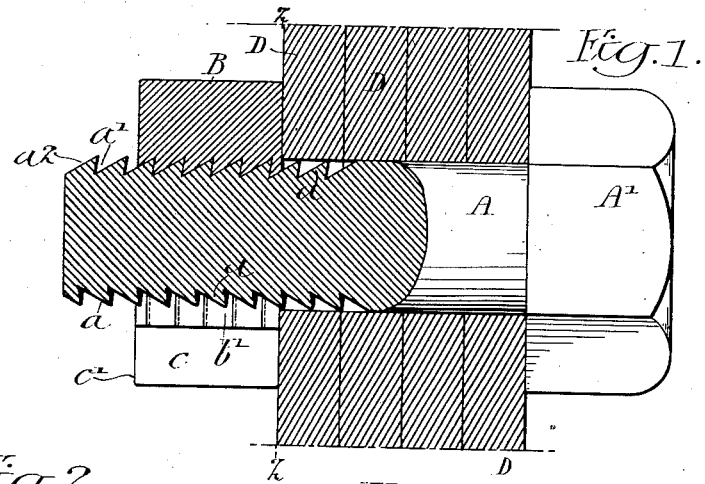
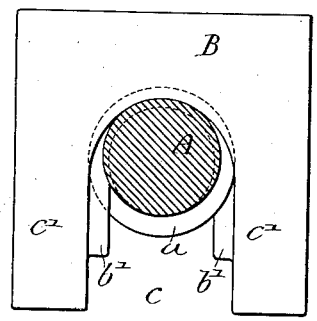
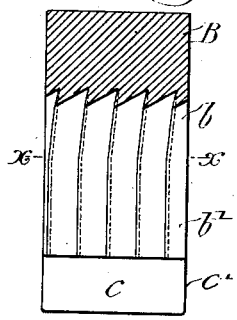
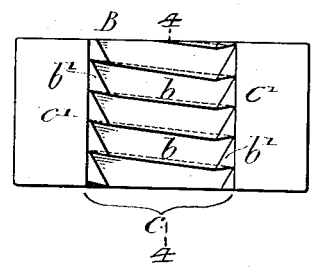
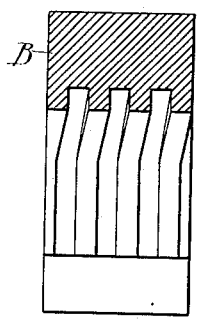
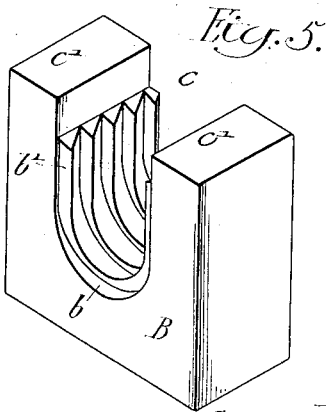
Witnesses:
Augustus B. Coppes
Titus H. Frons
Inventor:
George P. Thomas,
by his Attorneys, No. 781,571. Patented January 31, 1905.

UNITED STATES PATENT OFFICE.

GEORGE P. THOMAS, OF STEELTON, PENNSYLVANIA.

TEMPORARY FASTENING.

SPECIFICATION forming part of Letters Patent No. 781,571, dated January 31, 1905.

Application filed April 12, 1904. Serial No. 202,863.

*To all whom it may concern:*

Be it known that I, GEORGE P. THOMAS, a citizen of the United States, residing at Steelton, Pennsylvania, have invented certain Improvements in Temporary Fastenings, of which the following is a specification.

The object of my invention is to so construct a bolt and nut therefor that two or more pieces can be quickly fastened together temporarily or permanently, if desired. This object I attain in the following manner, reference being had to the accompanying drawings in which—

Figure 1 is a side view, partly in section, illustrating my improved bolt and nut. Fig. 2 is a section on the line 2 2, Fig. 1. Fig. 3 is an inverted plan view of the nut. Fig. 4 is a section on the line 4 4, Fig. 3. Fig. 5 is a perspective view of the nut. Fig. 6 is a sectional view illustrating a modification of the thread of the nut.

A is a bolt having a head $A'$ of any shape desired and having a screw-thread $a$. As shown in Fig. 1, this screw-thread has an undercut face $a'$ and a beveled back $a^2$ in the present instance.

B is a nut open at one side $c$, as shown in Fig. 2, so that the nut can be removed laterally from the bolt without unscrewing it to the end of the bolt. On the nut is a series of sections of thread corresponding to the thread of the bolt, and these sections are extended at $b'$ on the straight walls $c'$ of the opening $c$, preferably terminating beyond the line of the bolt, as indicated in Figs. 1 and 2.

It will be noticed that from the line $x$, which is the center line of the bolt, the threads of the nut extend parallel with the face of the nut, so as to allow for the ready adjustment of the nut on the bolt and for its quick withdrawal.

D D, Fig. 1, are plates which are to be temporarily secured together by the bolt and nut.

It will be noticed that the threads of the bolt and the nut are undercut, so that when the nut is turned to clamp the plates D it cannot move laterally, owing to the threads of the nut underlapping the thread of the bolt. In some instances I may make a square thread, as shown in Fig. 6, in place of the undercut thread, as shown in Fig. 1, and the thread may be modified considerably without departing from the main feature of my invention.

My improved bolt and nut are useful in temporarily bolting work together preparatory to final riveting or bolting, the invention being particularly adapted for bridge and structural ironwork, ship construction, boiler work, &c.

To apply the invention, the bolt is passed through an opening in the work and the nut slipped over the bolt at a point as near the work as possible, and then the nut is given a slight turn to draw the bolt and nut tightly against the work. This action also makes a firm lock between the nut and the bolt, preventing the nut moving laterally. To unfasten the nut, all that is necessary is to back it off slightly. Then it is free to be moved laterally, as there is sufficient space between the face of the nut and the work to allow its threads to readily pass the thread on the bolt.

While I have shown a square nut, it will be understood that the nut may be of any suitable form without departing from my invention.

I claim as my invention—

1. As a new article of manufacture, an open-sided nut for a temporary fastening having a series of segmental threads with extensions on the straight walls of the open side of the nut parallel to the face of said nut, whereby said nut is adapted to be readily applied to and removed from a bolt in a lateral direction.

2. The herein-described temporary fastening consisting of an open-sided nut provided with segmental threads having extensions in the walls of the open side of the nut parallel to the face thereof, and a bolt provided with threads adapted to engage said segmental threads of the nut, whereby the nut may be laterally applied to and removed from the bolt in a lateral direction.

In testimony whereof I have signed my name to this specification in the presence of two subscribing witnesses.

GEO. P. THOMAS.

Witnesses:
    J. G. STEVENSON,
    W. B. FRANKE.